United States Patent
Jiron et al.

(10) Patent No.: US 10,944,871 B1
(45) Date of Patent: *Mar. 9, 2021

(54) CENTRALIZED EVENT LOG GENERATION AND ANALYSIS FOR CONTACT CENTERS

(71) Applicant: Wells Fargo Bank, N.A., San Francisco, CA (US)

(72) Inventors: Julio Jiron, San Bruno, CA (US); Kevin King, Concord, CA (US); Beth S. Moss, Danville, CA (US); James Lyle Schafer, San Francisco, CA (US); Kalyan Subramanian, Scottsdale, AZ (US); Chris Theodore Kalaboukis, San Jose, CA (US); Raziq Yaqub, Stewartsville, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/894,347

(22) Filed: Jun. 5, 2020

Related U.S. Application Data (63) Continuation of application No. 15/905,318, filed on Feb. 26, 2018, now Pat. No. 10,694,040.

(51) Int. Cl.
   *H04M 3/51* (2006.01)
   *H04M 3/523* (2006.01)

(52) U.S. Cl.
   CPC ....... *H04M 3/5235* (2013.01); *H04M 3/5166* (2013.01)

(58) Field of Classification Search
   CPC .................. H04M 3/51; H04M 3/523
   See application file for complete search history.

(56) References Cited

U.S. PATENT DOCUMENTS 6,904,143 B1   6/2005   Peterson et al.
8,145,562 B2   3/2012   Wasserblat et al.
(Continued)

FOREIGN PATENT DOCUMENTS

WO   2016025943 A1   2/2016

OTHER PUBLICATIONS

"Protect Against Call Center Fraud," Pindrop, accessed from https://www.pindrop.com/solutions/anti-fraud/ on Sep. 28, 2017, 12 pp.
(Continued)

*Primary Examiner* — Harry S Hong
(74) *Attorney, Agent, or Firm* — Shumaker & Sieffert, P.A.

(57) ABSTRACT

A computer system is described that is configured to generate an entry in a centralized event log for each voice call into a contact center of an organization. The event log system is configured to receive call data associated with action performed during the call and retrieve context data associated with the call from across a plurality of disparate systems used by the contact center to service the call. The event log system is configured to include both the call data and the context data in the call entry, and to correlate the call entry with previous call entries for a same entity identified for the call. The call entry may also include entity profile data as metadata. The pertinent data for the call will be stored in a single, centralized location accessible by any of the front-end systems for use in determining how to handle the call.

20 Claims, 5 Drawing Sheets

(56) References Cited

U.S. PATENT DOCUMENTS

| | | |
|---|---|---|
| 8,160,941 B1 | 4/2012 | Field et al. |
| 8,347,364 B2 | 1/2013 | Babi et al. |
| 8,504,456 B2 | 8/2013 | Griffin et al. |
| 9,001,977 B1 | 4/2015 | Ramalingam et al. |
| 9,288,320 B2 | 3/2016 | Springer |
| 9,503,571 B2 | 11/2016 | Guerra et al. |
| 9,509,819 B2 | 11/2016 | Wildeman et al. |
| 9,532,209 B2 | 12/2016 | Aleksin et al. |
| 9,565,296 B2 | 2/2017 | Filonov et al. |
| 9,680,995 B2 | 6/2017 | Tendick et al. |
| 10,313,511 B1* | 6/2019 | Jiron ............ H04M 3/38 |
| 10,674,010 B1* | 6/2020 | Jiron ............ H04M 3/5166 |
| 10,694,040 B1* | 6/2020 | Jiron ............ H04M 3/5166 |
| 2001/0043697 A1 | 11/2001 | Cox et al. |
| 2003/0112928 A1* | 6/2003 | Brown ............ H04M 3/2218 379/67.1 |
| 2004/0208304 A1 | 10/2004 | Miller |
| 2006/0285665 A1 | 12/2006 | Wasserblat et al. |
| 2011/0206198 A1* | 8/2011 | Freedman ........ H04M 3/51 379/265.03 |
| 2015/0036813 A1 | 2/2015 | Ananthakrishnan et al. |
| 2015/0087265 A1 | 3/2015 | Disraeli et al. |
| 2015/0326714 A1 | 11/2015 | Roncoroni et al. |
| 2017/0017908 A1 | 1/2017 | Bracher et al. |
| 2017/0091780 A1 | 3/2017 | Kannan |
| 2017/0104874 A1* | 4/2017 | Yi ............ H04M 3/5175 |
| 2017/0133017 A1 | 5/2017 | Rajakumar et al. |
| 2018/0316687 A1 | 11/2018 | Hribovsek et al. |

OTHER PUBLICATIONS

"Protecting Your Call Centers Against Phone Fraud & Social Engineering," Pindrop Security, retrieve from https://www.pindrop.com/wp-content/uploads/2016/01/ pindrop_overview_whitepaper_fi_20141121_v2.pdf on Sep. 27, 2017, 14 pp.

Lariviere, "Learning customer personalities to better manage call centers," The Operations Room, accessed from https://operationsoom.wordpress.com/2010/12/08/learning-customer-personalities-to-better-manage-call-centers/, Dec. 8, 2010, 3 pp.

"Agile CRM Call Center Software," Agile CRM, accessed from https://www.agilecrm.com/call-center-crm on Sep. 27, 2017, 6 pp.

U.S. Appl. No. 16/722,847, filed Dec. 20, 2019, naming inventors Jiron et al.

Prosecution History from U.S. Appl. No. 15/905,318, dated Oct. 4, 2019 through May 19, 2020, 23 pp.

Office Action from U.S. Appl. No. 16/894,368, dated Jul. 23, 2020, 6 pages.

U.S. Appl. No. 16/894,368, filed Jun. 5, 2020, naming inventors Jiron et al.

Office Action from U.S. Appl. No. 16/894,368, dated Jul. 23, 2020, 7 pp.

Notice of Allowance from U.S. Appl. No. 16/894,368, dated Nov. 13, 2020, 5 pp.

\* cited by examiner

| CALL ID | ENTITY METADATA | DATE | TIME | ANI | ACCOUNT NUMBER | AUTH. METHOD | FLOW | IVR ACTIONS | AGENT ACTIONS | RISK SCORE |
|---|---|---|---|---|---|---|---|---|---|---|
| ABC | ENTITY A | 2017.12.2 | 7:42 | XXX-XXXX | AAABBBC | SSN-4 | IVR | AUTH; LAST TRANS | NA | LOW |
| BCD | ENTITY A | 2017.12.2 | 7:45 | XXX-XXXX | AAABBBC | LAST TRANS | IVR | AUTH; RESET PIN | NA | MEDIUM |
| CDE | ENTITY B | 2017.12.2 | 7:46 | XXX-XXXX | BCDEFGH TUVWXYZ | SSN-4 | AGENT; IVR | CHECK ACCT INFO | AUTH; RET ACCT INFO | LOW |
| DEF | ENTITY A | 2017.12.2 | 7:47 | XXX-XXXX | AAABBBC | PIN | IVR | AUTH; RESET SEC Q | NA | MEDIUM |
| EFG | ENTITY A | 2017.12.2 | 7:52 | XXX-XXXX | AAABBBC | SSN-4 | AGENT | NA | AUTH; NEW ACCOUNT | HIGH |
| FGH | ENTITY B | 2017.12.2 | 8:13 | XXX-XXXX | BCDEFGH TUVWXYZ | SSN-4 | AGENT | NA | AUTH; RET ACCT CNG | LOW |
| ... | | | | | | | | | | |
| XYZ | ENTITY N | 2017.12.2 | 11:00 | XXX-XXXX | ABCDXYZ | SSN-4 | IVR; AGENT | AUTH; LAST TRANS | NEW ACCOUNT | LOW |

CENTRALIZED EVENT LOG GENERATION AND ANALYSIS FOR CONTACT CENTERS

This application is a continuation of U.S. application Ser. No. 15/905,318, filed Feb. 26, 2018, the entire contents of which are incorporated herein by reference.

TECHNICAL FIELD

The disclosure relates to computer systems, and more specifically, logging information from across multiple computer systems.

BACKGROUND

A contact center is a facility configured to handle incoming voice calls from customers or potential customers of a business or organization. One function of the contact center is to handle customer service inquiries focused on customer accounts with the business, i.e., servicing existing accounts and opening new accounts. Although many customer service inquiries can be handled through online interactions (e.g., via websites, email, or mobile applications), for some businesses, a contact center may be regarded as necessary. Customers of banks, for example, may prefer to speak to a live person when resolving service issues. A contact center may include one or more interactive voice response (IVR) systems and one or more agent desktop systems used by a number of human agents that are representatives of the business. The IVR systems and agent desktop systems may be considered front-end systems of the contact center with which the customers directly interact. In addition to the front-end systems, the contact center may also include or interact with multiple back-end systems to access information about the business or about existing customers of that business in order to properly service a customer's voice call.

SUMMARY

In general, this disclosure describes a computer system configured to generate an entry in a centralized event log for each voice call into a contact center of an organization. The event log system is configured to gather and store data for the call from across a plurality of disparate systems used by the contact center to service the call. For example, the event log system may receive call data associated with actions performed during the call from event log data sensors, e.g., software plugins, executed in front-end systems within the contact center. The event log system may also retrieve context data associated with the call via application programming interfaces (APIs) for back-end systems of the contact center. The event log system is configured to include both the call data and the context data in the call entry. In addition, the event log system is configured to correlate the call entry with previous call entries for a same entity, e.g., a customer or caller, identified for the call. The call entry may also include at least a portion of entity profile data for the identified entity as metadata. In this way, the pertinent data for the call will be stored in a single, centralized location accessible by any of the front-end systems for use in determining how to handle the call, e.g., whether to continue the call as usual, or otherwise route or end the call in the case of a potential fraud determination.

In one example, this disclosure is directed to a computer-implemented method comprising receiving, by a computing system and from a plurality of front-end systems within a contact center of an organization, call data associated with actions performed during a call into the contact center; creating, by the computing system, an entry for the call in a centralized event log for the contact center, wherein the call entry includes the call data received from the plurality of front-end systems; correlating, by the computing system, the call entry with other call entries in the centralized event log for a same entity identified for the call; aggregating, by the computing system and from a plurality of back-end systems for the contact center, context data associated with the call, wherein the context data is appended to the call entry in the centralized event log; and transmitting, by the computing system, a pointer to the call entry in the centralized event log to one or more of the front-end systems for use in determining how to handle the call.

In another example, this disclosure is directed to a computing system comprising one or more storage units configured to store a centralized event log for a contact center of an organization, and one or more processors in communication with the storage units. The one or more processors are configured to receive, from a plurality of front-end systems within the contact center, call data associated with actions performed during a call into the contact center; create an entry for the call in the centralized event log for the contact center, wherein the call entry includes the call data received from the plurality of front-end systems; correlate the call entry with other call entries in the centralized event log for a same entity identified for the call; aggregate, from a plurality of back-end systems for the contact center, context data associated with the call, wherein the context data is appended to the call entry in the centralized event log; and transmit a pointer to the call entry in the centralized event log to one or more of the front-end systems for use in determining how to handle the call.

In a further example, this disclosure is directed to a non-transitory computer readable medium including instructions that when executed cause one or more processors to receive, from a plurality of front-end systems within a contact center of an organization, call data associated with actions performed during a call into the contact center; create an entry for the call in a centralized event log for the contact center, wherein the call entry includes the call data received from the plurality of front-end systems; correlate the call entry with other call entries in the centralized event log for a same entity identified for the call; aggregate, from a plurality of back-end systems for the organization, context data associated with the call, wherein the context data is appended to the call entry in the centralized event log; and transmit a pointer to the call entry in the centralized event log to one or more of the front-end systems for use in determining how to handle the call.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
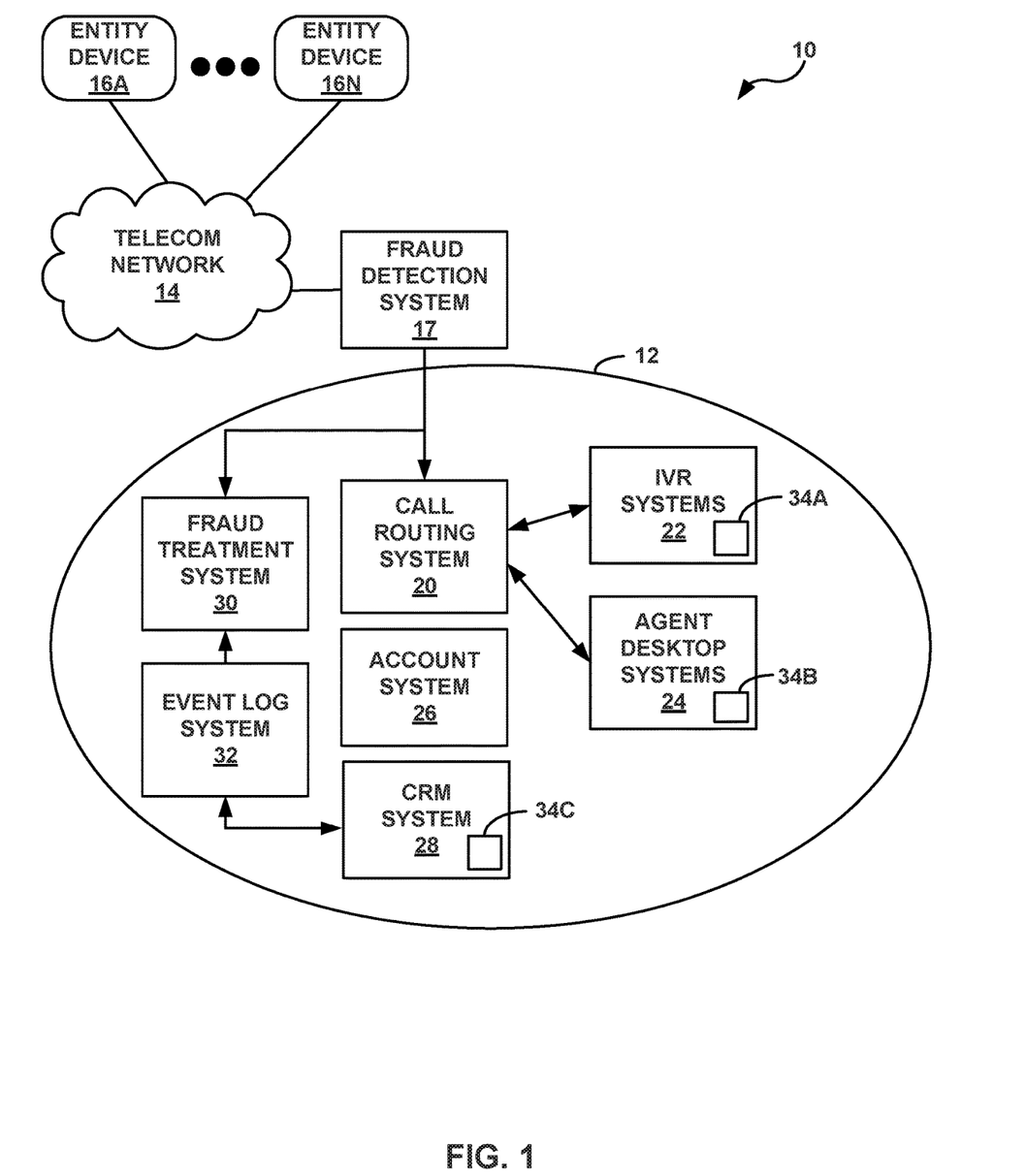
FIG. 1 is a block diagram illustrating an example contact center that includes an event log system configured to generate a centralized event log for the contact center, in accordance with the techniques of this disclosure.

FIG. 1 is a block diagram illustrating an example contact center 12 within a network 10 that includes an event log system 32 configured to generate a centralized event log for contact center 12, in accordance with the techniques of this disclosure. As illustrated in FIG. 1, network 10 includes one or more entity devices 16A-16N (collectively "entity devices 16") in communication with contact center 12 via a telecommunications network 14.

Contact center 12 is a facility configured to handle incoming voice calls from entity devices 16 operated by users that may be customers or potential customers of a business or organization. In some cases, contact center 12 may be referred to as a call center. Contact center 12 includes several disparate computing systems configured to handle customer service inquiries focused on customer accounts with the business, i.e., servicing existing accounts and opening new accounts. In some examples described in this disclosure, contact center 12 may be a contact center of a bank or other financial institution. Contact center 12 may be especially useful for those customers that prefer to speak to a live person when resolving service issues or that feel more comfortable sharing personal information over a voice channel than an online channel (e.g., website, email, or mobile application). Contact center 12 may also provide certain services that may not be available via online channels, such as opening new accounts with the business or organization.

Entity devices 16 may be any suitable communication or computing device, such as a conventional or landline phone, or a mobile, non-mobile, wearable, and/or non-wearable computing device capable of communicating over telecom network 14. One or more of entity devices 16 may support communication services over packet-switched networks, e.g., the public Internet, including Voice over Internet Protocol (VOIP). One or more of entity device 16 may also support communication services over circuit-switched networks, e.g., the public switched telephone network (PSTN).

Each of entity devices 16 is operated by a user (i.e., the caller) that may be a customer or a potential customer of the business or organization that provides contact center 12. In the case of a business or corporate customer, the user may be a representative of the business or corporate customer. In some examples, the user may be a non-human robo-caller utilized by a fraudster or bad actor. In general, each of entity devices 16 may represent a landline phone, a conventional mobile phone, a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, or non-mobile computing device that may perform operations in accordance with one or more aspects of the present disclosure.

Telecom network 14 may be a computer network (e.g., a wide area network (WAN), such as the Internet, a local area network (LAN), or a virtual private network (VPN)), a telephone network (e.g., the PSTN or a wireless network), or another wired or wireless communication network. Although illustrated as a single entity, telecom network 14 may comprise a combination of multiple networks.

Contact center 12 may comprise a centralized or distributed network of the disparate computing systems made up of interconnected desktop computers, laptops, workstations, wireless devices, network-ready appliances, file servers, print servers, or other computing devices. For example, contact center 12 may comprise one or more data centers including a plurality of servers configured to provide account services interconnected with a plurality of databases and other storage facilities in which customer credentials, customer profiles, and customer accounts are stored. Contact center 12 may include both "front-end systems" with which the customers or potential customers of the business or organization directly interact, and "back-end systems" in which information about contact center 12, the business, or existing customers of the business is maintained.

In the example of FIG. 1, contact center 12 includes one or more interactive voice response (IVR) systems 22, one or more agent desktop systems 24 used by a number of human agents that are representatives of the business or organization, and a customer relationship management (CRM) system 28 as "front-end systems." In this example, the front-end systems may be third-party vendor products used by the business or organization to interact with its customers. Contact center 12 also includes a call routing system 20, account system 26, a fraud treatment system 30, and event log system 32 as "back-end systems." In this example, the back-end systems may be propriety tools of the business or organization to facilitate the functions of contact center 12, including collecting, storing, and maintaining data used by contact center 12. In addition, contact center 12 interacts with fraud detection system 17 as another "back-end system," which may be included in contact center 12 itself or may be administered by a third-party network (not shown). The architecture of contact center 12 illustrated in FIG. 1 is shown for exemplary purposes only and should not be limited to this architecture. In other examples, contact center 12 may include more, fewer, or different computing systems configured to handle customer service inquiries.

In the example of FIG. 1, one of entity devices 16, e.g., entity device 16A, may initiate a call to contact center 12 of a bank in response to input from a user of entity device 16A. Entity device 16A outputs a signal over telecom network 14. Fraud detection system 17 may operate as a gateway to contact center 12 by providing an initial determination of whether an inbound call is fraudulent. For example, fraud detection system 17 may compare markers, e.g., phoneprints or voiceprints, for the inbound call to known fraudsters, and provide risk information to contact center 12. In some examples, fraud detection system 17 may be implemented using fraud detection solutions for call centers available through Pindrop®. Fraud detection system 17 may provide a risk score or other indication of potentially fraudulent intent for each inbound call to contact center 12. In the case where the inbound call is flagged with a high probability of being fraudulent by fraud detection system 17, the call and the risk information may be sent directly to fraud treatment system 30 of contact center 12 without entering call routing system 20.

In other cases, where the inbound call is not flagged as fraudulent by fraud detection system 17, call routing system 20 receives the inbound call from telecom network 14 and determines whether to route the inbound call to one of IVR systems 22 or one of agent desktop systems 24. Call routing system 20 may route calls to one of a number of destinations, including to IVR systems 22, agent desktop systems 24, or to other devices, users, or systems. In some examples, call routing system 20 may be implemented using call routing solutions available through Genesys Telecommunications Laboratories. In an example where entity device 16A requests to speak with a human agent or selects a service that can only be performed by a human agent, call routing system 20 routes the call to one of agent desktop systems 24, thereby enabling a user of entity device 16A and a human agent at the one of agent desktop systems 24 to engage in a voice communication session. In an example where entity device 16A selects a service for which an IVR program is available, call routing system 20 routes the call to the appropriate one of IVR systems 22, thereby enabling the user of entity device 16A to interact with the IVR program.

Authentication of the user operating entity device 16A may be performed by either an authentication IVR program provided by one of IVR systems 22 or any of the human agents at agent desktop systems 24. As one example, the one of IVR systems 22 may issue authentication challenges to the user of entity device 16A during the call, store the responses received from the user via entity device 16A, and, based on the responses, make a determination about whether the user of entity device 16A is authenticated or issue additional authentication challenges. As an alternative example, a human agent at one of agent desktop systems 24 may issue authentication challenges to the user of entity device 16A during the voice communication session and, upon hearing the response of the user of entity device 16A, the human agent may make a determination about whether the user of entity device 16A is authenticated or issue additional authentication challenges. In either example, the authentication determination may be based on customer credentials accessible from account system 26 and/or CRM system 28.

Once the user of entity device 16A is authenticated as a customer of the business or organization, one or more of IVR systems 22 and/or the human agents at agent desktop systems 24 may process account service requests received from the customer via entity device 16A. In the example of a bank or other financial institution, the account service requests may include account balance inquiries, most recent transaction inquiries, money transfers, opening or closing accounts, updating or resetting security credentials, changing or rebalancing investment funds, and the like. IVR systems 22 and the human agents at agent desktop systems 24 may process the account service requests by accessing customer accounts via account system 26 and customer profiles via CRM system 28.

Conventionally, each of IVR systems 22 and agent desktop systems 24 may perform some fraud assessment on the inbound call based on the risk information for the call provided by fraud detection system 17 and additional information detected, gathered, or inferred by the respective system during the call. This fraud assessment, however, is based only on the information known to the respective system for the particular inbound call. As described above, IVR systems 22 and agent desktop systems 24, and other front-end systems, may be vendor products such that the data learned or generated by each of the systems is maintained in a different data silo. It may be difficult, therefore, for one front-end system to retrieve and analyze data for the inbound call from another front-end system provided by another vendor. It may also be difficult, for a front-end system to retrieve and analyze data associated with the inbound call from the bank-end systems provided by the business or organization of contact center 12.

In addition, IVR systems 22 and agent desktop systems 24 may not have access to any historical perspective with respect to other calls related to the same customer or entity, or typical behaviors for the customer or entity. For example, these front-end systems may be unable to track inbound calls over time to know that the current inbound call is the fifty-first call associated with the same customer within an hour, or that that high call volume is out of character for that customer. Based on these issues, IVR systems 22 and agent desktop systems 24 may be unable to make accurate fraud determinations and take appropriate actions for the call in real-time.

According to the techniques described in this disclosure, event log system 32 is configured to generate an entry in a centralized event log for each voice call into contact center 12. Event log system 32 is configured to gather and store data for the call from across the plurality of disparate systems used by contact center 12 to service the call. For example, event log system 12 may receive call data associated with actions performed during the call from event log data sensors 34A-34C (collectively, "event log data sensors 34") executed in the front-end systems within contact center 12, e.g., IVR systems 22, agent desktop systems 24, and CRM system 28. Each of event log data sensors 34 may comprise a software plugin configured to identify the call data for inclusion in the centralized event log and transmit the identified call data to event log system 32. Event log data sensors 34 may be programmable with respect to what data to identify and transmit, e.g., via a software development kit (SDK). In this way, the operation of the front-end systems, which may be vendor products, does not need to be modified to interact with other front-end or back-end systems included in contact center 12, beyond installation and programming of one of event log data sensors 34.

Event log system 32 may also retrieve context data associated with the call via application programming interfaces (APIs) for the back-end systems of contact center 12, e.g., fraud detection system 17, call routing system 20, and account system 26. The context data may include information about the origins of the call. Event log system 32 is configured to include both the call data and the context data in the call entry in the centralized event log, and to correlate the call entry with previous call entries for the same entity to provide historical call data. The call entry may also include at least a portion of entity profile data as metadata. In this way, the pertinent data for the call will be stored in a single, centralized location, i.e., the centralized event log.

The call entry for the incoming call and any of the correlated call entries may be accessible by IVR systems 22, agent desktop systems 24, or any other front-end system for use in determining how to handle the call, e.g., whether to continue the call as usual, or otherwise route or end the call in the case of a potential fraud determination. In some examples, event log system 32 itself may analyze the data in the call entry along with the correlated call entries to determine a fraud risk score of the call for use by the front-end system in making a fraud determination.

Once a fraud determination has been made by the front-end system, the call may be sent to fraud treatment system 30 for application of one or more interdiction schemes. In some examples, the type of interdiction scheme applied to the call by fraud treatment system 30 may be based on a risk score determined for the call. It may not be desirable to immediately block or drop a call indicated to have some probability of fraudulent intent. Instead, it may be useful to continue monitoring the call in an attempt to gain additional intelligence about the caller and the fraudulent scheme until the caller attempts to do something more egregious. For example, fraud treatment system 30 may monitor the risk score of a call entry for a given call or a group of correlated call entries for a series of calls for the same entity against a preset threshold. Once the risk score exceeds the preset threshold, fraud treatment system 30 may perform an interdiction scheme, such as requesting additional authentication, accepting only the most secure forms of authentication, randomizing IVR or banking servicing prompts, or dropping/blocking the call.

Figure 2:
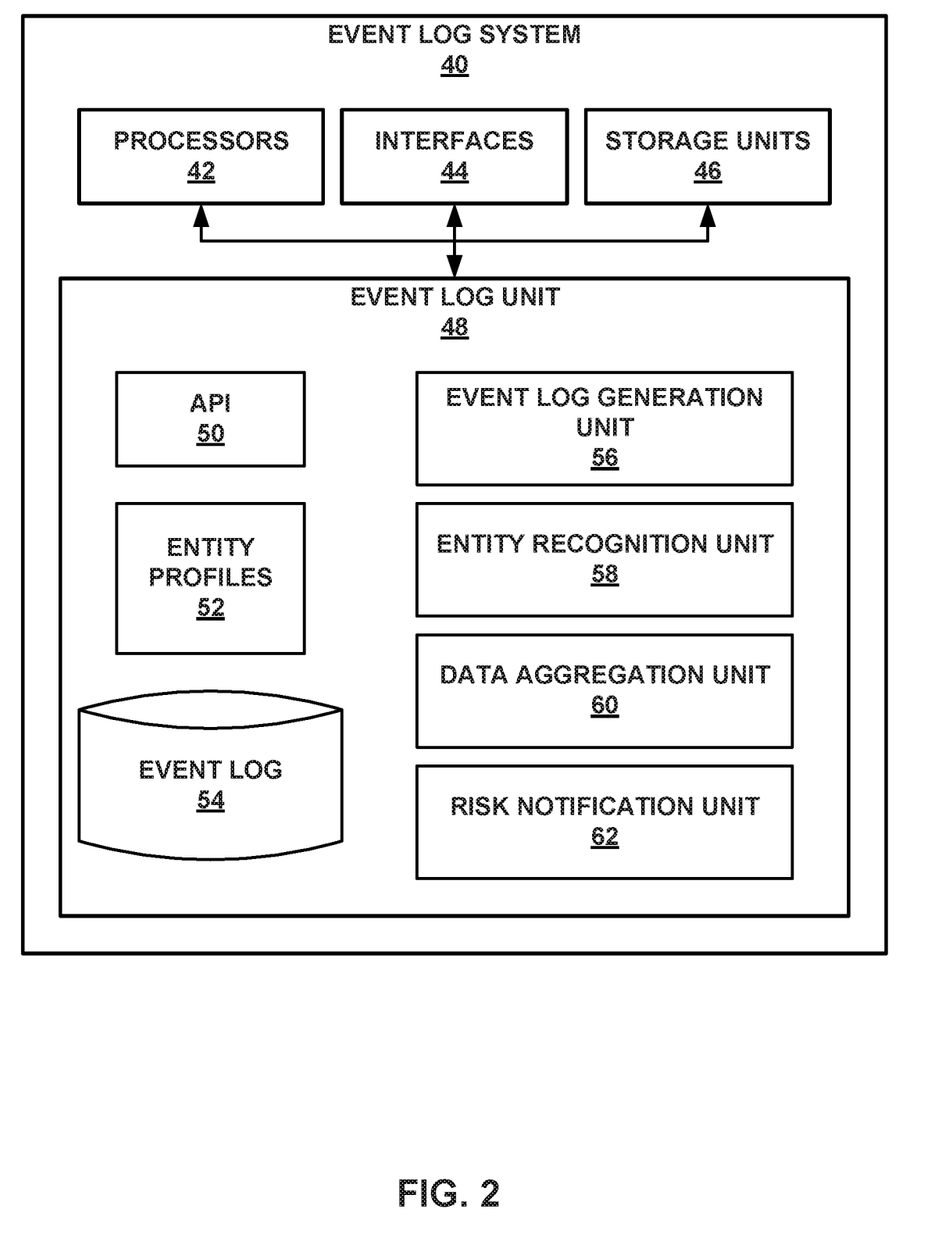
FIG. 2 is a block diagram illustrating an example computing device of the event log system within the contact center from FIG. 1, in accordance with the techniques of this disclosure.

FIG. 2 is a block diagram illustrating an example event log system 40 within a contact center, in accordance with the techniques of this disclosure. Event log system 40 of FIG. 2 may be described as an example or alternative implementation of event log system 32 within contact center 12 of FIG. 1. One or more aspects of event log system 40 of FIG. 2 may be described within the context of contact center 12 of FIG. 1.

Event log system 40 is configured to receive and/or retrieve data for each call into contact center 12 from multiple disparate systems within contact center 12, and create an entry in a centralized event log 54 in which to store the data. In this way, the pertinent data for the call is stored in a centralized location and accessible for analysis by event log system 40 or another system in contact center 12 to determine whether fraud treatment should be applied to the call. The architecture of event log system 40 illustrated in FIG. 2 is shown for exemplary purposes only. Event log system 40 should not be limited to the illustrated example architecture. In other examples, event log system 40 may be configured in a variety of ways.

Event log system 40 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, event log system 40 represents a cloud computing system, server farm, and/or server cluster (or portion thereof) that provides services to client devices and other devices or systems. In other examples, event log system 40 may represent or be implemented through one or more virtualized compute instances (e.g., virtual machines, containers) of a data center, cloud computing system, server farm, and/or server cluster.

As shown in the example of FIG. 2, event log system 40 includes one or more processors 42, one or more interfaces 44, one or more storage units 46. Event log system 40 also includes event log unit 48, which may be implemented as program instructions and/or data stored in storage units 46 and executable by processors 42 or implemented as one or more hardware units or devices of event log system 40. Storage units 46 of event log system 40 may also store an operating system (not shown) executable by processors 42 to control the operation of components of event log system 40. The components, units or modules of event log system 40 are coupled (physically, communicatively, and/or operatively) using communication channels for inter-component communications. In some examples, the communication channels may include a system bus, a network connection, an inter-process communication data structure, or any other method for communicating data.

Processors 42, in one example, may comprise one or more processors that are configured to implement functionality and/or process instructions for execution within event log system 40. For example, processors 42 may be capable of processing instructions stored by storage units 46. Processors 42 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Storage units 46 may be configured to store information within event log system 40 during operation. Storage units 46 may include a computer-readable storage medium or computer-readable storage device. In some examples, storage units 46 include one or more of a short-term memory or a long-term memory. Storage units 46 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage units 46 are used to store program instructions for execution by processors 42. Storage units 46 may be used by software or applications running on event log system 40 (e.g., event log unit 48) to temporarily store information during program execution.

Event log system 40 may utilize interfaces 44 to communicate with external systems via one or more networks, e.g., contact center 12 of FIG. 1. Interfaces 44 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, event log system 40 utilizes interfaces 44 to wirelessly communicate with external systems, e.g., fraud detection system 17, call routing system 20, IVR systems 22, agent desktop systems 24, account system 26, CRM system 28, or fraud treatment system 30 of contact center 12 from FIG. 1.

In the illustrated example of FIG. 2, event log unit 48 includes an application programming interface (API) 50, entity profiles 52, event log 54, event log generation unit 56, entity recognition unit 58, data aggregation unit 60, and risk notification unit 62. In accordance with the disclosed techniques, event log unit 48 is configured to create centralized event log 54 to capture, store, and share data associated with each call into a contact center, e.g., contact center 12 of FIG. 1. Although illustrated in FIG. 2 as being included in event log system 40, in other examples, event log 54 may be maintained externally in one or more of a plurality of databases and other storage facilities accessible via contact center 12. In some examples, event log 54 may be encrypted. The type of encryption, strength of encryption, and encryption channel used to encrypt event log 54 may be configurable by one or more administrators of contact center 12.

When a call enters contact center 12, event log system 40 may receive a notification of the inbound call from fraud detection system 17, call routing system 20, or another computing device that performs at least some gateway functions for contact center 12. Such a notification may be received via interfaces 44 of event log system 40 and forwarded to event log generation unit 56 of event log unit 48. Event log generation unit 56 creates an entry for the inbound call in centralized event log 54. In some examples, upon receiving the notification of the inbound call, event log generation unit 56 may assign a unique call identifier (ID) to the inbound call. The unique call ID may be used to index the newly created entry for the inbound call in centralized event log 54.

As the call progresses through contact center 12, e.g., entering one of IVR systems 22 or entering a voice communication session with a human agent at one of agent desktop systems 24, event log unit 48 updates and appends information to the call entry in centralized event log 54. The information included in the call entry in centralized event log 54 at least includes call data associated with actions performed during the call and context data associated with the call. Event log unit 48 may receive the different types of information for the call from the disparate systems in contact center 12 using different types of data collectors, e.g., as "pushed" data fed to event log system 40 or as "pulled" data requested and retrieved by event log system 40.

Event log system 40 receives call data associated with actions performed during the inbound call from one or more event log data sensors 34 executed in the front-end systems within contact center 12. Interfaces 44 of event log system 40 may receive the call data and forward the call data to event log generation unit 56 of event log unit 48. For example, event log generation unit 56 may receive data about IVR actions during the call from event log data sensor 34A executed in IVR systems 22 within the contact center 12. Event log generation unit 56 may receive data about agent actions during the call from event log data sensor 34B executed in agent desktop systems 24 within contact center 12. Event log generation unit 56 may further receive customer information updates during the call from event log data sensor 34C executed in CRM system 28 for the organization. Event log generation unit 56 includes the received call data in the entry for the inbound call in centralized event log 54.

As described in more detail below with respect to FIG. 3, each of event log data sensors 34 may comprise a software plugin configured to identify the call data for inclusion in centralized event log 54 and transmit the identified call data to event log system 40. In this example, event log data sensors 34 are configured to "push" the call data to event log system 40, and event log system 40 is configured to receive the call data from the event log data sensors 34 via interfaces 44. The call data may include details regarding caller authentication, customer account access, and/or customer account servicing performed via IVR systems 22, agent desktop systems 24, CRM system 28, or other customer-facing vendor systems included in contact center 12. More specifically, the call data associated with authentication may include an inbound Automatic Number Identification (ANI) for the caller, a customer account identified by the caller, and an authentication method used by the caller. The call data associated with customer account access and/or customer account servicing may include a list of actions performed by one of more IVR programs accessed by the caller, a list of actions performed by one or more human agents having voice communication sessions with the caller, and changes to the customer's account and/or security settings requested by the caller.

Entity recognition unit 58 of event log unit 48 is configured to correlate the call entry for the inbound call with other call entries in centralized event log 54 for a same entity identified for the inbound call. Entity recognition unit 58 may utilize artificial intelligence (AI) or machine learning during a training phase to generate entity profiles 52 for one or more entities, i.e., individual or business customers, of the business or organization of contact center 12. This training phase may occur before event log unit 40 "goes live" and begins logging the calls entering contact center 12. Entity profiles 52 may be generated based on customer base information learned from one or more of CRM system 28 and account system 26 via API 50. Entity profiles 52 may identify multiple different accounts, phone numbers (i.e., ANIs), or other touchpoints that resolve to the same entity. In addition, entity profiles 52 may include customer behavior and preferences with respect to accessing accounts via contact center 12.

After event log generation unit 56 receives the call data for the inbound call, entity recognition unit 58 identifies the entity associated with the inbound call based on at least a portion of the call data for the inbound call. For example, entity recognition unit 58 may match at least one of the ANI, an account number, or other identifying information for the inbound call to one of entity profiles 52 to identify the entity associated with the call. Entity recognition unit 58 then links the call entry for the inbound call to the other call entries for the same entity in centralized event log 54. In some examples, entity recognition unit 58 may append at least a portion of the one of entity profiles 52 for the identified entity as metadata for the call entry in centralized event log 54. The metadata may include the customer behavior and preferences from the one of entity profiles 52.

Data aggregation unit 60 is configured to aggregate data for the inbound call from the disparate systems of contact center 12. More specifically, data aggregation unit 60 is configured to aggregate context data for the call from the plurality of back-end systems with the call data for the call from the plurality of front-end systems in the call entry within centralized event log 54. Conventionally, the data from each of these systems is maintained in different data silos and is not aggregated or analyzed in real-time.

Event log system 40 retrieves context data associated with the inbound call from the plurality of back-end systems within contact center 12 via API 50. For example, data aggregation unit 60 may retrieve fraud data associated with the inbound call from fraud detection system 17 via API 50. Data aggregation unit 60 may also retrieve data about contact channels associated with the call from call routing system 20 within contact center 12 via API 50. Data aggregation unit 60 may further retrieve data about accounts associated with the entity identified for the inbound call from account system 26 within contact center 12 via API 50. Data aggregation unit 60 appends the context data retrieved from the plurality of back-end systems to the call entry in centralized event log 54.

API 50 comprises a defined interface through which event log unit 48 interacts with the plurality of back-end systems within contact center 12. API 50 may be configured to "pull" the context data from the back-end systems using defined request and response messages with APIs for the respective back-end systems. Although illustrated in FIG. 2 as including a single API, in other examples, event log system 40 may include a plurality of APIs to pull the context data from the plurality of back-end systems.

The context data may include details regarding fraud risk assessment, connection channel, and customer account identification for the call determined or maintained by fraud detection system 17, call routing system 20, account system 26, or other proprietary systems included in contact center 12. More specifically, the context data associated with fraud risk assessment may include risk information, such as a risk score or other indication of potentially fraudulent intent. The context data associated with the connection channel may include the inbound ANI for the call, a toll-free number dialed by the caller to access the contact center, a connection ID assigned to the call, a date stamp, start and end time stamps of the call, call duration, and an initiating endpoint (e.g., conventional phone or computing device running VOIP) of the call. In addition, the context data associated with the connection channel may include whether the call was routed between human agents or IVRs, the specific IVR programs used to service the call and/or the names of the human agents to whom the caller was connected during the call. The context data associated with customer account identification may include one or more account numbers that belong to the entity identified for the call.

Risk notification unit 62 of event log unit 48 may transmit a pointer to the call entry for the inbound call included in centralized event log 54 to one or more of the front-end systems within contact center 12 for use in determining how to handle the call. For example, the pointer to the call entry may be the unique call ID used to index the call entry within centralized event log 54. In this way, the fraud determination for the inbound call may continue to be performed by the front-end systems, e.g., IVR systems 22 or agent desktop systems 24, but will be based on the full set of data collected for the inbound call in the call entry within centralized event log 54. The front-end systems, therefore, have access to all of the actions performed during the call by any of the disparate front-end systems, information about the origins of the call determined by any of the disparate back-end systems, historical perspective with respect to other calls related to the same entity, and typical behaviors for the entity.

In some examples, risk notification unit 62 or another unit of event log unit 48 may analyze the call data and the context data included in the call entry along with the correlated call entries for the entity to determine a fraud risk score of the call. Risk notification unit 62 may append the fraud risk score for the call to the call entry in centralized event log 54. In this example, risk notification unit 62 may transmit the pointer to the call entry that includes the fraud risk score to the one or more front-end systems within contact center 12 for use in determining how to handle the call. In other examples, risk notification unit 62 may transmit the pointer to the call entry that includes the fraud risk score to fraud treatment system 30 to determine the appropriate treatment of the call based on a potential fraud determination.

In accordance with the techniques of this disclosure, risk notification unit 62 may analyze the data included the call entry in near real-time to generate the fraud risk score for the call. Risk notification unit 62 may initially assign a higher or lower risk score for the inbound call based on previous behavior associated with the entity identified for the inbound call. For example, a risk score may be stored in one of the other call entries associated with the same entity as the with the inbound call, and that risk score may be used as the initial risk score for the inbound call. As the call progresses through contact center 12, risk notification unit 62 may update the risk score included in the call entry for the inbound call in real-time based on new data.

Figure 3:
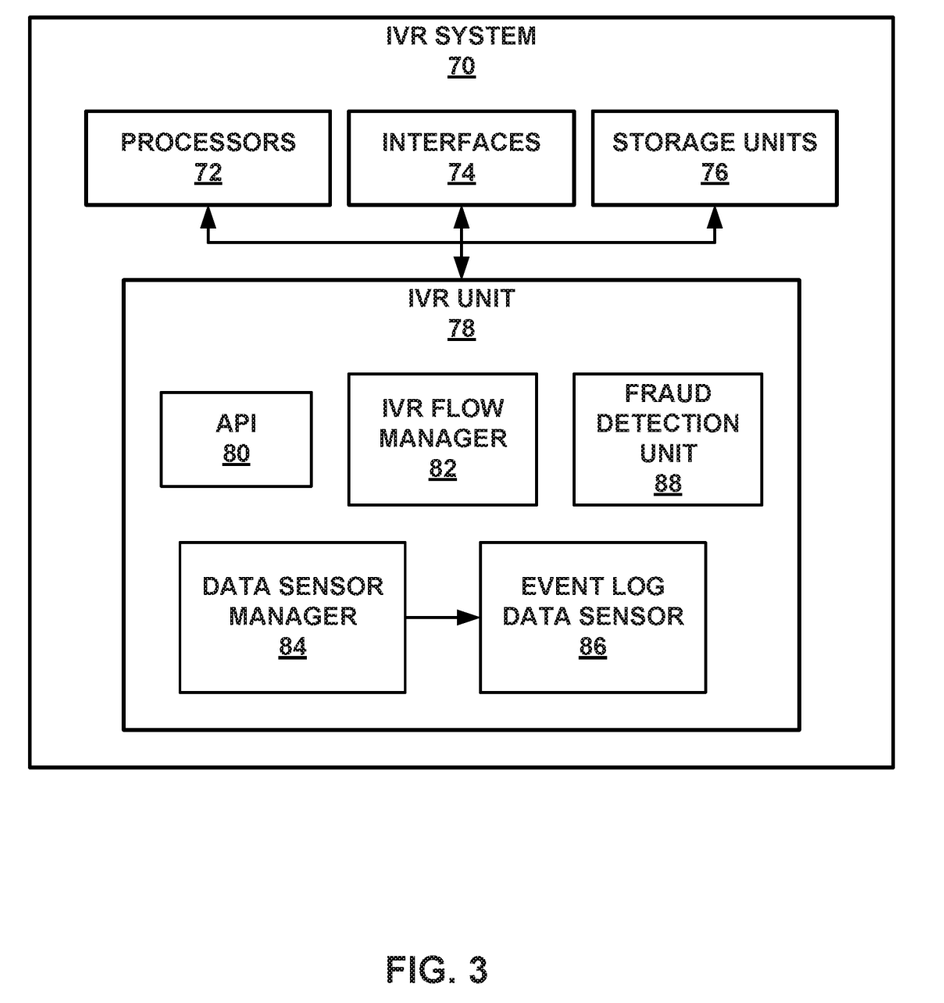
FIG. 3 is a block diagram illustrating an example computing device of an IVR system within the contact center from FIG. 1, in accordance with the techniques of this disclosure.

FIG. 3 is a block diagram illustrating an example IVR system 70 within a contact center, in accordance with the techniques of this disclosure. IVR system 70 of FIG. 3 may be described as an example implementation of one of IVR systems 22 within contact center 12 of FIG. 1. One or more aspects of IVR system 70 of FIG. 3 may be described within the context of contact center 12 of FIG. 1. IVR system 70 is configured to host a particular IVR program to perform customer service functions for voice calls into contact center 12. The architecture of IVR system 70 illustrated in FIG. 3 is shown for exemplary purposes only. IVR system 70 should not be limited to the illustrated example architecture. In other examples, IVR system 70 may be configured in a variety of ways.

IVR system 70 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, IVR system 70 represents a cloud computing system, server farm, and/or server cluster (or portion thereof) that provides services to client devices and other devices or systems. In other examples, IVR system 70 may represent or be implemented through one or more virtualized compute instances (e.g., virtual machines, containers) of a data center, cloud computing system, server farm, and/or server cluster.

As shown in the example of FIG. 3, IVR system 70 includes one or more processors 72, one or more interfaces 74, one or more storage units 76. IVR system 70 also includes IVR unit 78, which may be implemented as program instructions and/or data stored in storage units 76 and executable by processors 72 or implemented as one or more hardware units or devices of IVR system 70. Storage units 76 of IVR system 70 may also store an operating system (not shown) executable by processors 72 to control the operation of components of IVR system 70. The components, units or modules of computing device 30 are coupled (physically, communicatively, and/or operatively) using communication channels for inter-component communications. In some examples, the communication channels may include a system bus, a network connection, an inter-process communication data structure, or any other method for communicating data.

Processors 72, in one example, may comprise one or more processors that are configured to implement functionality and/or process instructions for execution within IVR system 70. For example, processors 72 may be capable of processing instructions stored by storage units 76. Processors 72 may include, for example, microprocessors, DSPs, ASICs, FPGAs, or equivalent discrete or integrated logic circuitry, or a combination of any of the foregoing devices or circuitry.

Storage units 76 may be configured to store information within IVR system 70 during operation. Storage units 76 may include a computer-readable storage medium or computer-readable storage device. In some examples, storage units 76 include one or more of a short-term memory or a long-term memory. Storage units 76 may include, for example, RAM, DRAM, SRAM, magnetic discs, optical discs, flash memories, or forms of EPROM or EEPROM. In some examples, storage units 76 are used to store program instructions for execution by processors 72. Storage units 76 may be used by software or applications running on IVR system 70 (e.g., IVR unit 78) to temporarily store information during program execution.

IVR system 70 may utilize interfaces 74 to communicate with external systems via one or more networks, e.g., contact center 12 of FIG. 1. Interfaces 74 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, IVR system 70 utilizes interfaces 74 to wirelessly communicate with external systems, e.g., call routing system 20, fraud treatment system 30, or event log system 32 of contact center 12 from FIG. 1.

In the illustrated example of FIG. 3, IVR unit 78 includes an API 80, an IVR flow manager 82, a data sensor manager 84, an event log data sensor 86, and a fraud detection unit 88. Event log data sensor 86 may operate substantially similar to event log data sensor 34A of IVR systems 22 from FIG. 1. Although described herein with respect to an IVR system, components similar to data sensor manager 84 and event log data sensor 86 may also be included in other front-end systems within contact center 12 to transmit call data to event log system 32 in accordance with the techniques of this disclosure. For example, any of agent desktop systems 24 and/or CRM system 28 may each include data sensor managers and event log data sensors. These data sensors may operate substantially similar to event log data sensor 34B of agent desktop systems 24 and event log data sensor 34C of CRM system 28, respectively, from FIG. 1.

IVR system 70 hosts an IVR program used to perform customer service functions for calls into contact center 12, such as authentication, retrieving customer account information, retrieving the last several transactions performed using a specific account, initiating a fund transfer, changing account settings, resetting a PIN or other security credentials, or the like. IVR flow manager 82 of IVR unit 78 may manage the order in which input prompts are presented to a caller of an inbound call to facilitate the customer service functions provided by the IVR program.

The order in which input prompts are presented to the caller may be based on an IVR input prompt tree and a caller's response to one or more input prompts. The one or more or more input prompts may include one or more requests for information and/or one or more telephony menus, with each telephony menu having one or more different input options (e.g., press "1" for English or press "2" for Spanish would be a telephony menu having two input options). Each telephony menu may include one or more telephony sub-menus. IVR flow manager 82 may be configured to receive input information from the caller's telephone via interfaces 74 and process the input information. Processing input information received from a caller's telephone may result in one or more results. For example, IVR flow manager 82 may provide one or more subsequent input prompts, may initiate a call transfer, or perform any other action based on the input information.

Data sensor manager 84 of IVR unit 78 enables installation, updating, and removal of software plugins from IVR system 70. In accordance with the techniques of this disclosure, data sensor manager 84 is used to install event log data sensor 86. Event log data sensor 86 comprises a software plugin configured to identify call data associated with IVR actions performed by IVR flow manager 82 during the inbound call for inclusion in a centralized event log maintained by an event log system, e.g., event log system 32 of FIG. 1 or event log system 40 of FIG. 2. For example, as the inbound call enters the IVR program hosted by IVR system 70, event log data sensor 86 collects the identified call data and transmits the identified call data to the event log system of contact center 12 via interfaces 74.

Event log data sensor 86 may be programmable with respect to what data to identify and transmit to the event log system. For example, data sensor manager 84 may enable programming of event log data sensor 86 via a software development kit (SDK). In some examples, the SDK used to program event log data sensor 86 may include API 80. In other examples, instead of using event log data sensor 86 to collect and transmit the context data for the call, API 80 may be used to communicate the context data associated with the IVR actions performed during the call with an API for the event log system of contact center 12.

Fraud detection unit 88 of IVR unit 78 may perform the fraud determination for the inbound call based on the full set of data collected for the inbound call in the call entry within the centralized event log maintained by the event log system of contact center 12. Fraud detection unit 88 may receive a pointer to the call entry for the inbound call included in the centralized event log via interfaces 74. For example, the pointer to the call entry may be a unique call ID used to index the call entry within the centralized event log. Using the pointer, fraud detection unit 88 may access all of the actions performed during the call by any of the disparate front-end systems in contact center 12, information about the origins of the call determined by any of the disparate back-end systems in contact center 12, historical perspective with respect to other calls related to the same entity, and typical behaviors for the entity.

Fraud detection unit 88 may analyze the call data and the context data included in the call entry along with the correlated call entries for the entity to determine whether to continue the call as usual, or otherwise route or end the call in the case of a potential fraud determination. For example, fraud detection unit 88 may determine a fraud risk score of the call based on the data in the call entry within the centralized event log. In accordance with the techniques of this disclosure, fraud detection unit 88 may analyze the data included the call entry in near real-time to generate the fraud risk score for the call. In one example, when a fraud determination has made for the call, fraud detection unit 88 may forward the call via interfaces 74 to fraud treatment system 30 within contact center 12 for application of one or more interdiction schemes.

Figure 4:
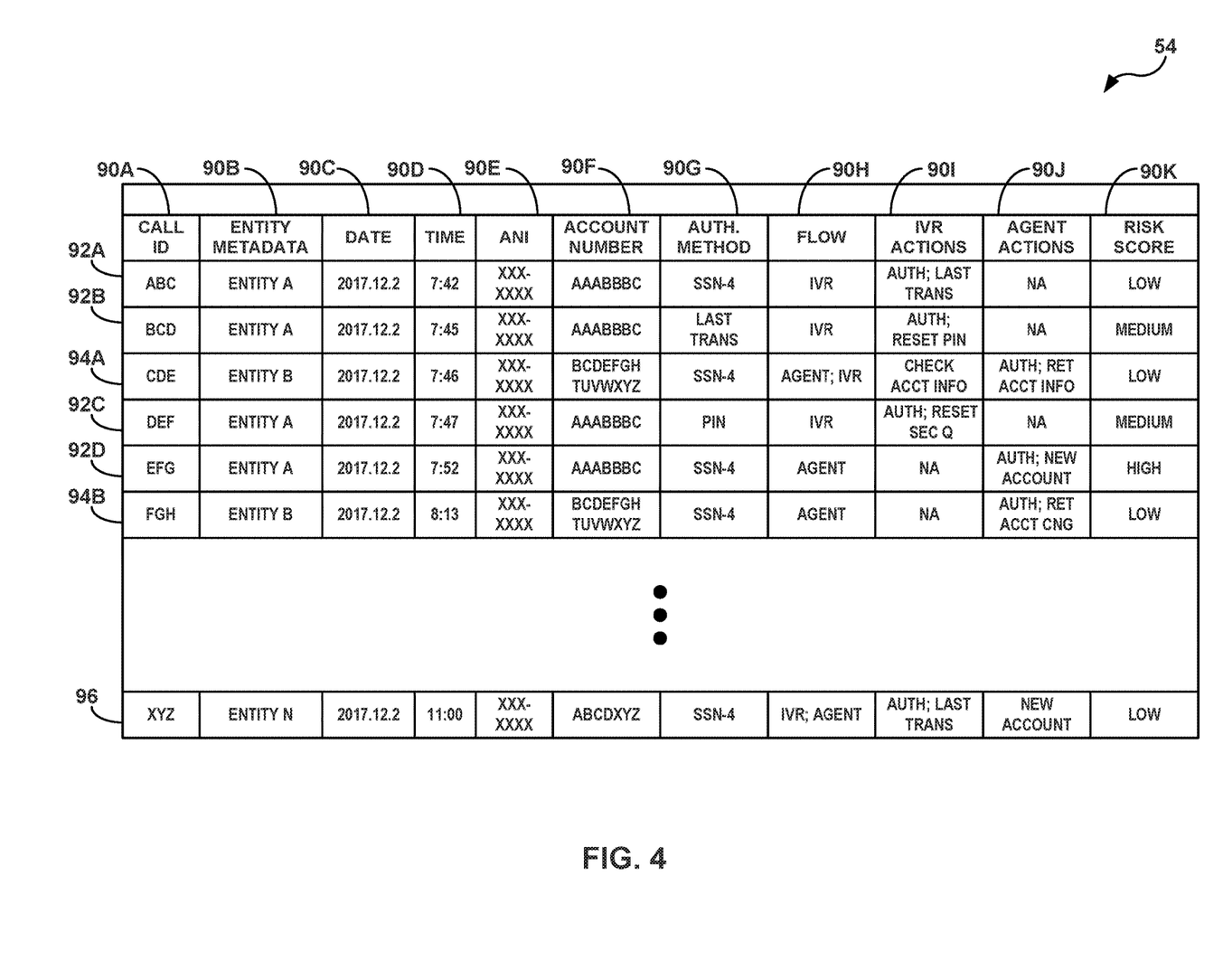
FIG. 4 is a conceptual diagram illustrating example entries of a centralized event log for a contact center, in accordance with the techniques of this disclosure.

FIG. 4 is a conceptual diagram illustrating example entries of centralized event log 54 for contact center 12, in accordance with the techniques of this disclosure. As described above with respect to FIG. 2, event log system 40 is configured to receive and/or retrieve data for each call into contact center 12 from multiple disparate systems within contact center 12, and create an entry in centralized event log 54 in which to store the data. In this way, the pertinent data for each call is stored in a centralized location and accessible for analysis by event log system 40 or another system in contact center 12 to determine whether fraud treatment should be applied to the call.

In the example illustrated in FIG. 4, centralized event log 54 includes an entry for each call into contact center 12. Each of the entries in centralized event log 54 includes the following data fields: call ID 90A, entity metadata 90B, date 90C, time 90D, ANI 90E, account number 90F, authentication method 90G, flow 90H, IVR actions 90I, agent actions 90J, and risk score 90K.

Call ID field 90A indicates a unique combination of numbers, letters, or symbols assigned by event log generation unit 56 to uniquely identify a given call into contact center 12. The call ID for the given call may be used as an index into centralized event log 54. Date field 90C and time field 90D indicate the date and time at which the inbound call was received by contact center 12. In this example, time field 90D may indicate the start time of the call. Although not shown in FIG. 4, in other examples, centralized event log 54 may include an indication of call duration or call end time. Data aggregation unit 60 may retrieve the date and time of the inbound call from call routing system 20 via API 50.

ANI field 90E indicates the phone number of the entity device from which the inbound call originated. The ANI may be automatically identified by call routing system 20 upon receipt of the inbound call. In some example, data aggregation unit 60 may retrieve the ANI of the inbound call from call routing system 20 via API 50. In other examples, the ANI of the inbound call may be used as part of the caller authentication performed by one of the front-end systems, e.g., IVR systems 22 or agent desktop systems 24, and event log generation unit 56 may receive the ANI via one of event log data sensors 34 executed by the one of the front-end systems used to perform authentication.

Account number field 90F indicates one or more account numbers associated with the entity identified for the call. In some cases, at least one of the account numbers may be entered by the caller for identification or authentication purposes. In other cases, one or more of the account numbers may be determined by one or more of the front-end systems based on the ANI of the inbound call or other identifying information provided by the caller. Event log generation unit 56 may receive the account numbers via event log data sensors 34 executed by the one of the front-end systems used to perform authentication and/or CRM system 28. In still other cases, one or more of the account numbers may be determined by account system 26 based on the identified entity. Data aggregation unit 60 may retrieve the account numbers via API 50.

Entity metadata field 90B indicates metadata including profile information for the entity identified for the inbound call. Entity recognition unit 58 may identify the entity associated with the inbound call based on the ANI or the one or more account numbers for the inbound call. For example, entity recognition unit 58 may match at least one of the ANI, an account number, or other identifying information for the incoming call to one of entity profiles 52 maintained by event log system 40 to identify the entity associated with the call. The metadata may include profile information, e.g., customer behavior and preferences, retrieved from the one of entity profiles 52 and/or received from CRM system 28 via event log data sensor 34C.

Authentication method field 90G indicates the method by which the caller was authenticated or attempted to be authenticated. Some example authentication methods include the last four digits of a customer's social security number (SSN-4), a personal identification number (PIN) associated with one or more accounts held by the customer, and the last several transactions performed using at least one of the accounts held by the customer. Other authentication methods may be available, including voice biometric authentication or some combination of known ANI, mother's maiden name, and other security questions. Event log generation unit 56 may receive the authentication method via one of event log data sensors 34 executed by the one of the front-end systems used to authenticate or attempt to authenticate the caller. Although not shown in FIG. 4, in other examples, centralized event log 54 may include an indication of whether authentication was successful.

Flow field 90H indicates the flow or path of the inbound call through the disparate systems of contact center 12, e.g., whether and in what order the call was transferred to IVR systems 22 and/or agent desktop systems 24. In some examples, the call flow may include the specific IVR programs used to service the call and/or the names of the human agents to whom the caller was connected during the call. Data aggregation unit 60 may retrieve the call flow information from call routing system 20 via API 50.

IVR actions field 90I indicates a list of actions performed by IVR systems 22 to service the inbound call. The actions may include authentication, retrieving customer account information, retrieving the last several transactions performed using a specific account, initiating a fund transfer, changing account settings, resetting a PIN or other security credentials, or the like. Event log generation unit 56 may receive the IVR actions from IVR systems 22 via sensor 34A.

Agent actions field 90J indicates a list of actions performed by agent desktop systems 24 to service the inbound call. The actions performed by the human agents via agent desktop systems 24 may include the same actions listed above for IVR systems 22, and a few additional actions that may only be performed by the human agents. For example, opening new accounts, closing existing accounts, and/or adding or removing authorized users of existing accounts may only be performed by human agents. Event log generation unit 56 may receive the agent actions from agent desktop systems 24 via sensor 34B.

Risk score field 90K indicates a risk score calculated for the inbound call. In some examples, data aggregation unit 60 may retrieve the risk score from fraud detection system 17 via API 50. In other examples, risk notification unit 62 may calculate the risk score based on the risk information received from fraud detection system 17, and analysis of the call data and context data included in the call entry along with the correlated call entries for the entity.

The data fields and entries of centralized event log 54 illustrated in FIG. 4 are shown for exemplary purposes only. In other examples, centralized event log 54 may include more, fewer, or other data fields, and the entries may be organized in a different fashion. In some cases, the fields and entry organization of centralized event log 54 may be configurable by one or more administrators of contact center 12.

According to the techniques of this disclosure, multiple call entries within centralized event log 54 may be correlated based on a common entity identified for the calls. In the example of FIG. 4, centralized event log 54 includes call entries 92A-92D (collectively "call entries 92") associated with entity A, call entries 94A-94B (collectively "call entries 94") associated with entity B, and a single call entry 96 associated with entity N. The individual call entries may be stored at any available position within centralized event log 54. For example, as shown in FIG. 4, the call entries are stored in order of time at which the respective calls entered contact center 12. The correlation between call entries associated with a common entity may be represented by a common identifier or metadata appended to each of the call entries for a given entity. In the illustrated example, each of call entries 92 include entity A metadata, and each of call entries 94 include entity B metadata. In other examples, a portion of the call ID or a separate entity ID may be used to link together the call entries for the same entity.

As one example, call entries 92 for entity A illustrate an escalating risk of fraudulent behavior occurring on the associated customer account. The four correlated call entries 92A-92D indicate that the calls entered contact center 12 within a ten-minute window between 7:42 and 7:52 on the same day. Call entry 92A for a first call indicates that the caller used SSN-4 to authenticate itself and gain access to the associated account AAABBBC, and used IVR systems 22 for authentication and to identify the last several transactions performed using the associated account. The actions performed during the first call logged in call entry 92A appear normal and a low risk score is assigned to the first call.

Call entry 92B for a second call indicates that the caller used the last several transactions on the associated account to authenticate itself, and used IVR systems 22 for authentication and to reset the PIN for the associated account. Risk notification unit 62 may calculate a medium risk score for the second call based on the use of account data (i.e., the last several transactions) provided to the caller during the previous first call logged in call entry 92A as the authentication method for the subsequent second call. This behavior may be an indication of surveillance fraud. The medium risk score may be sent to IVR systems 22 and/or fraud treatment system 30 to determine the appropriate treatment of the call. For purposes of this example, it may be assumed that the appropriate treatment is to continue monitoring the call in an attempt to gain additional intelligence about the caller and the potentially fraudulent scheme.

Call entry 92C for a third call indicates that the caller used the PIN for the associated account to authenticate itself, and used IVR systems 22 for authentication and to reset the security questions for the associated account. Risk notification unit 62 may calculate a medium risk score for the third call based on the risk score for the previous second call logged in call entry 92B, and the use of the PIN reset during the previous second call as the authentication method for the subsequent third call. Again, for purposes of this example, it may be assumed that the appropriate treatment is to continue monitoring the call in an attempt to gain additional intelligence about the caller and the potentially fraudulent scheme.

Call entry 92D for a fourth call indicates that the caller used the SSN-4 for the associated account to authenticate itself, and used agent desktop systems 24 for authentication and to open a new account. In order to open a new account, the caller may need to supply additional authentication credentials. As seen from the previous correlated calls, however, the caller has already reset the PIN and the security questions for the associated account. Risk notification unit 62 may calculate a high risk score for the fourth call based on the risk score for the previous third call logged in call entry 92C and the intent of the caller to open a new account using recently reset security credentials. In response to the high risk score, agent desktop systems 24 and/or fraud treatment system 30 may perform some interdiction scheme including requesting additional authentication based on security credentials not recently accessed or reset, or may drop the call and notify the account customer of the recent activity.

As another example, call entries 94 for entity B illustrate a series of low risk behaviors occurring on the associated customer account. The two correlated call entries 94A-94B indicate that the calls entered contact center 12 within approximately a thirty-minute window between 7:46 and 8:13 on the same day. Call entry 94A for a first call indicates that the caller used SSN-4 to authenticate itself, and used agent desktop systems 24 for authentication and to retrieve retirement account information from associated retirement account TUVWXYZ. Call entry 94A for the first call also indicates that the caller used IVR systems 22 to retrieve checking account information from associated checking account BCDEFGH. The actions performed during the first call logged in call entry 94A appear normal and a low risk score is assigned to the first call.

Call entry 94B for a second call indicates that the caller again used SSN-4 to authenticate itself, and used agent desktop systems 24 for authentication and to make a change to associated retirement account TUVWXYZ. For example, the caller may request the human agent to reallocate funds in the associated retirement account. Risk notification unit 62 may calculate a low risk score for the second call based on the risk score for the previous call logged in call entry 94A, and the reasonable action of the caller in requesting a change to an account shortly after retrieving the account information.

The final example of call entry 96 for entity N illustrates a single, uncorrelated call entry included in centralized event log 54. Call entry 96 indicates that the caller used SSN-4 to authenticate itself, and used IVR systems 22 for authentication and to identify the last several transactions performed using the associated account ABCDXYZ. Call entry 96 also indicates that the caller used agent desktop systems 24 to open a new account. The actions performed during the single call logged in call entry 96 appear normal and a low risk score is assigned to the first call.

Figure 5:
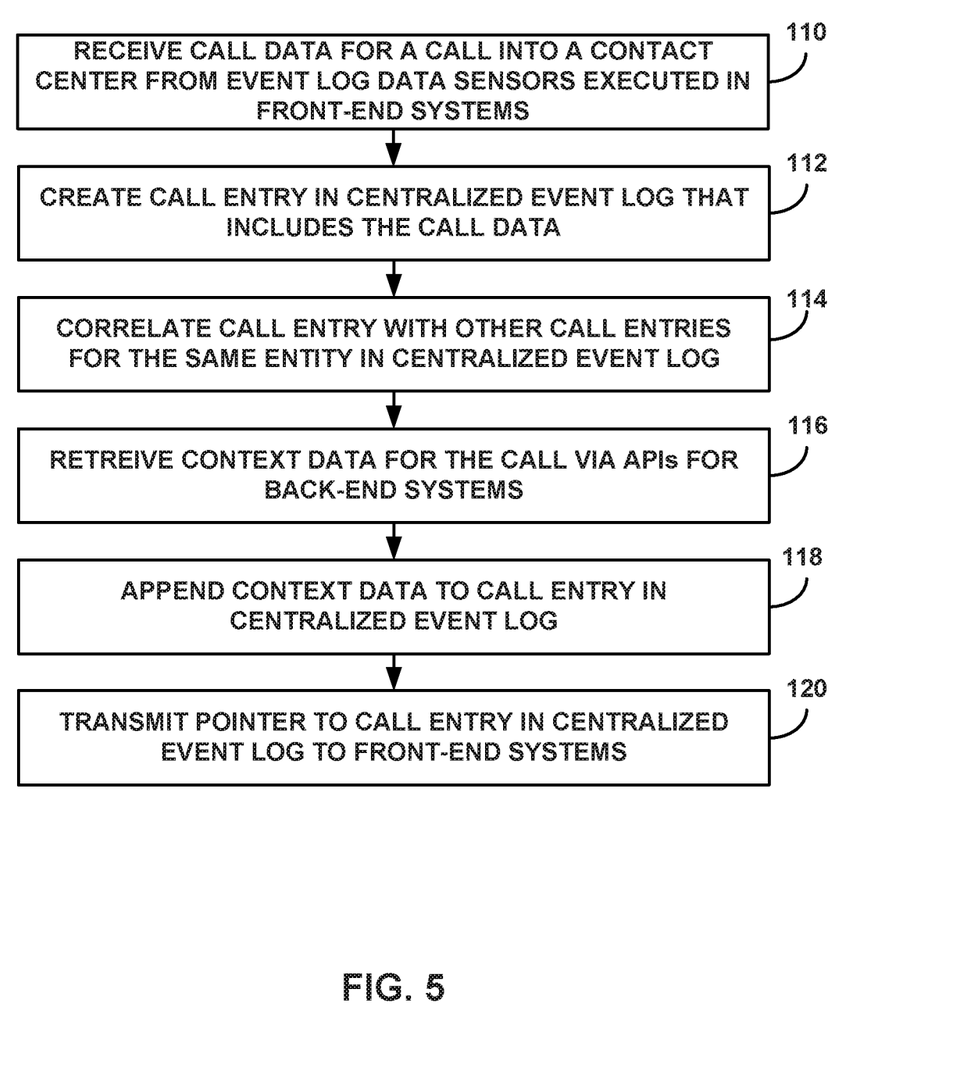
FIG. 5 is a flowchart illustrating an example operation of a computing device of an event log system automatically generating and analyzing a sharable event log, in accordance with the techniques of this disclosure.

FIG. 5 is a flowchart illustrating an example operation of a computing device of an event log system automatically generating and analyzing a sharable event log, in accordance with the techniques of this disclosure. The example operation of FIG. 5 is described with respect to event log system 40 of FIG. 2 and event log system 32 within contact center 12 of FIG. 1. When a call enters contact center 12, event log system 40 may receive a notification of the inbound call from fraud detection system 17, call routing system 20, or another computing device that performs at least some gateway functions for contact center 12. In some examples, upon receiving the notification of the inbound call, event log generation unit 56 may assign a unique call ID to the inbound call.

Event log system 40 receives call data associated with actions performed during the inbound call into contact center 12 from event log data sensors 34 executed in each of the front-end systems within contact center 12 (110). The actions performed during the inbound call may include caller authentication, customer account access, and/or customer account servicing. For example, event log unit 48 may receive data about IVR actions during the call from event log data sensor 34A executed in IVR systems 22 within the contact center 12. In addition, event log unit 48 may receive data about agent actions during the call from event log data sensor 34B executed in agent desktop systems 24 within contact center 12. Event log unit 48 may further receive customer information updates during the call from event log data sensor 34C executed in CRM system 28 for the organization. Event log generation unit 56 creates an entry for the call in centralized event log 54 that includes the call data received from the event log data sensors 34 of the plurality of front-end systems (112).

Entity recognition unit 58 correlates the call entry with other call entries in centralized event log 54 for the same entity identified for the inbound call (114). Prior to receiving call data, event log system 40 may generate entity profiles 52 for one or more individual or business customers of the organization based on customer base information learned via an API for CRM system 28 for the organization. After receiving the call data, entity recognition unit 58 matches at least a portion of the call data for the call entry to one of the entity profiles 52 to identify the entity associated with the call. Entity recognition unit 58 then links the call entry for the call to the other call entries for the same entity in centralized event log 54. In some examples, entity recognition unit 58 may append at least a portion of the one of entity profiles 52 for the identified entity as metadata for the call entry in centralized event log 54.

Data aggregation unit 60 retrieves context data associated with the call via APIs for the plurality of back-end systems within contact center 12 (116). The context data may include information about the origins of the call. For example, data aggregation unit 60 may retrieve fraud data associated with the call via an API for third-party fraud detection system 17. Data aggregation unit 60 may also retrieve data about contact channels associated with the call from an API for call routing system 28 within contact center 12. Data aggregation unit 60 may further retrieve data about accounts associated with the entity identified for the call from an API for account system 26 within contact center 12. Data aggregation unit 60 appends the context data retrieved from the plurality of back-end systems to the call entry in centralized event log 54 (118).

Risk notification unit 62 transmits a pointer to the call entry in centralized event log 54 to one or more of the front-end systems for use in determining how to handle the call (120). For example, the pointer to the call entry may be the unique call ID used to index the call entry within centralized event log 54. In some examples, in response to receiving the pointer, the front-end systems may analyze the call data and the context data included in the call entry along with the correlated call entries for the entity to determine whether to continue the call as usual, or otherwise route or end the call in the case of a potential fraud determination. In one scenario, when a fraud determination has made for the call, the front-end system may forward the call to fraud treatment system 30 for application of one or more interdiction schemes.

In other examples, risk notification unit 62 may analyze the call data and the context data included in the call entry along with the correlated call entries for the entity to determine a fraud risk score of the call. Risk notification unit 62 may append the fraud risk score for the call to the call entry in centralized event log 54, and transmit the pointer to the call entry that includes the fraud risk score to the one or more front-end systems for use in determining how to handle the call. In still other examples, fraud treatment system 30 may perform the analysis of the call entry in centralized event log 54 and/or may determine the appropriate treatment of the call based on a potential fraud determination.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computer-implemented method comprising:
receiving, by a computing system and from a plurality of front-end systems within a contact center of an organization, call data associated with actions performed during a call into the contact center;
creating, by the computing system, an entry for the call in a centralized event log for the contact center, wherein the call entry includes the call data received from the plurality of front-end systems, context data associated with the call received from a plurality of back-end systems, and a common identifier that correlates the call entry with other call entries in the centralized event log for a same entity identified for the call;

analyzing, by the computing system, the call data and the context data included in the call entry along with the correlated call entries having the same common identifier as the call entry to determine a fraud risk score of the call; and transmitting, by the computing system, a pointer to the call entry in the centralized event log that includes the fraud risk score to one or more of the front-end systems for use in determining how to handle the call.

2. The method of claim 1, further comprising appending the fraud risk score to the call entry in the centralized event log.

3. The method of claim 1, wherein receiving the call data comprises receiving at least a portion of the call data from an event log data sensor executed in each of the plurality of front-end systems.

4. The method of claim 1, wherein receiving the call data comprises:
receiving, from a first event log data sensor executed in an interactive voice response (IVR) system within the contact center, data about IVR actions during the call;
receiving, from a second event log data sensor executed in an agent desktop system within the contact center, data about agent actions during the call; and
receiving, from a third event log data sensor executed in a customer relationship management (CRM) system for the organization, customer information updates during the call.

5. The method of claim 1, further comprising:
generating entity profiles based on customer base information learned via an application programing interface (API) for a customer relationship management (CRM) system for the organization;
matching at least a portion of the call data for the call entry to one of the entity profiles; and
appending the common identifier to the call entry in the centralized event log to correlate the call entry for the call to the other call entries in the centralized event log for the same entity.

6. The method of claim 5, further comprising appending at least a portion of the entity profile as metadata for the call entry in the centralized event log.

7. The method of claim 1, further comprising:
retrieving the context data associated with the call from the plurality of back-end systems;
aggregating the retrieved context data from the plurality of back-end systems; and
appending the aggregated context data to the call entry in the centralized event log.

8. The method of claim 7, wherein retrieving the context data comprises retrieving at least a portion of the context data via an application programing interface (API) for each of the plurality of back-end systems.

9. The method of claim 7, wherein retrieving the context data comprises:
retrieving, via a first application programing interface (API) for a third-party fraud detection system, fraud data associated with the call;
retrieving, from a second API for a call routing system within the contact center, data about contact channels associated with the call; and
retrieving, from a third API for an account system within the contact center, data about accounts associated with the entity identified for the call.

10. A computing system comprising:
one or more storage units configured to store a centralized event log for a contact center of an organization; and
one or more processors in communication with the storage units and configured to:
receive, from a plurality of front-end systems within the contact center, call data associated with actions performed during a call into the contact center;
create an entry for the call in the centralized event log for the contact center, wherein the call entry includes the call data received from the plurality of front-end systems, context data associated with the call received from a plurality of back-end systems, and a common identifier that correlates the call entry with other call entries in the centralized event log for a same entity identified for the call;
analyze the call data and the context data included in the call entry along with the correlated call entries having the same common identifier as the call entry to determine a fraud risk score of the call; and
transmit a pointer to the call entry in the centralized event log that includes the fraud risk score to one or more of the front-end systems for use in determining how to handle the call.

11. The computing system of claim 10, wherein the one or more processors are configured to append the fraud risk score to the call entry in the centralized event log.

12. The computing system of claim 10, wherein the one or more processors are configured to receive at least a portion of the call data from an event log data sensor executed in each of the plurality of front-end systems.

13. The computing system of claim 10, wherein, to receive the call data, the one or more processors are configured to:
receive, from a first event log data sensor executed in an interactive voice response (IVR) system within the contact center, data about IVR actions during the call;
receive, from a second event log data sensor executed in an agent desktop system within the contact center, data about agent actions during the call; and
receive, from a third event log data sensor executed in a customer relationship management (CRM) system for the organization, customer information updates during the call.

14. The computing system of claim 10, wherein the one or more processors are configured to:
generate entity profiles based on customer base information learned via an application programing interface (API) for a customer relationship management (CRM) system for the organization;
match at least a portion of the call data for the call entry to one of the entity profiles; and
append the common identifier to the call entry in the centralized event log to correlate the call entry for the call to the other call entries for the same entity.

15. The computing system of claim 14, wherein the one or more processors are configured to append at least a portion of the entity profile as metadata for the call entry in the centralized event log.

16. The computing system of claim 10, wherein the one or more processors are configured to:
retrieve the context data associated with the call from the plurality of back-end systems;

aggregate the retrieved context data from the plurality of back-end systems; and append the context data retrieved from the plurality of back-end systems to the call entry in the centralized event log.

17. The computing system of claim 16, wherein the one or more processors are configured to retrieve at least a portion of the context data via an application programing interface (API) for each of the plurality of back-end systems.

18. The computing system of claim 16, wherein, to retrieve the context data, the one or more processors are configured to:

retrieve, via a first application programing interface (API) for a third-party fraud detection system, fraud data associated with the call;

retrieve, from a second API for a call routing system within the contact center, data about contact channels associated with the call; and retrieve, from a third API for an account system within the contact center, data about accounts associated with the entity identified for the call.

19. A non-transitory computer readable medium including instructions that when executed cause one or more processors to:

receive, from a plurality of front-end systems within a contact center of an organization, call data associated with actions performed during a call into the contact center;

create an entry for the call in a centralized event log for the contact center, wherein the call entry includes the call data received from the plurality of front-end systems, context data associated with the call received from a plurality of back-end systems, and a common identifier that correlates the call entry with other call entries in the centralized event log for a same entity identified for the call;

analyze the call data and the context data included in the call entry along with the correlated call entries having the same common identifier as the call entry to determine a fraud risk score of the call; and transmit a pointer to the call entry in the centralized event log that includes the fraud risk score to one or more of the front-end systems for use in determining how to handle the call.

20. The non-transitory computer readable medium of claim 19, wherein the instructions cause the one or more processors to append the fraud risk score to the call entry in the centralized event log.

* * * * *